US005312466A

United States Patent [19]

Taberlet et al.

[11] Patent Number: 5,312,466

[45] Date of Patent: May 17, 1994

[54] PUMPING INSTALLATION FOR PUMPING OUT AN ENCLOSURE CONTAINING GASES WHICH ARE MIXED WITH SOLID PARTICLES OR WHICH GENERATE SOLID CONDENSATES OR PARTICLES

[75] Inventors: Eric Taberlet, Annecy le Vieux; Albert Cacard, Groisy, both of France

[73] Assignee: Alcatel Cit, Paris, France

[21] Appl. No.: 64,579

[22] Filed: May 21, 1993

[30] Foreign Application Priority Data

May 22, 1992 [FR] France ................................ 92 06296

[51] Int. Cl.[5] ............................................ B01D 45/12

[52] U.S. Cl. ..................................... 55/429; 55/459.1; 55/459.4

[58] Field of Search .................... 55/429, 459.1, 459.4, 55/459.5, 385.2

[56] References Cited

U.S. PATENT DOCUMENTS 2,534,702 12/1950 Driessen .
4,097,381 6/1978 Ritzler ........................... 55/459.1 X
4,867,767 9/1989 Yokoyama ..................... 55/459.1 X
4,995,794 2/1991 Wycliffe et al. .................... 417/431
5,096,477 3/1992 Shinoda et al. ................ 55/385.2 X

FOREIGN PATENT DOCUMENTS 0320956 6/1989 European Pat. Off. .
0338764 10/1989 European Pat. Off. .
607788 9/1948 United Kingdom .

OTHER PUBLICATIONS

International Application WO91/14494 published Mar. 10, 1991.

*Primary Examiner*—Charles Hart
*Attorney, Agent, or Firm*—Sughrue, Mion, Zinn, Macpeak & Seas

[57] ABSTRACT

The present invention relates to a pumping installation for pumping out an enclosure containing gases which are mixed with solid particles or which generate solid condensates or particles, said installation including a pump equipped with a feed system for supplying an inert purge gas, the pump having its exhaust orifice connected to an evacuation duct, wherein said evacuation duct is connected to said exhaust orifice via a static particle-separator device whose driving flow is solely the exhaust flow of the pump.

2 Claims, 2 Drawing Sheets

PUMPING INSTALLATION FOR PUMPING OUT AN ENCLOSURE CONTAINING GASES WHICH ARE MIXED WITH SOLID PARTICLES OR WHICH GENERATE SOLID CONDENSATES OR PARTICLES

The present invention relates to a pumping installation for pumping out an enclosure containing gases that may generate solid condensates or particles under certain temperature and/or pressure conditions, or that are mixed with solid particles from the outset.

BACKGROUND OF THE INVENTION

Industrial installations in which vacuum pumps are used to evacuate work chambers, e.g. when reactive gases are pumped in the semiconductor industry, include evacuation ducts leading to the outside and connected to the outlets of the pumps. It is not possible to allow the pumping unit to deliver inside the factory, in particular because of the noxiousness of some of the pumped gases. It is therefore absolutely necessary to evacuate the exhaust gases to the outside. This is done via a duct that often contains a purification system referred to as a "Scrubber" system, and an extractor fan.

In order to dilute the pumped gases and so as to enable them to be evacuated more quickly at the outlet of the pump, the pumping unit, e.g. a multi-stage Roots pump, is equipped with a feed system for supplying an inert "purge" gas which is injected into the various ,stages of the pump. This enables improved evacuation of the above-mentioned condensates or particles, thereby protecting the inside of the pump. However, it does not prevent particles from being deposited in the evacuation duct whose cross-sectional area decreases over time with such deposition, thereby giving rise to excessive pressure at the outlet, which excessive pressure damages the pump. Furthermore, such particles also cause damage in the purification device, if there is such a device.

OBJECT AND SUMMARY OF THE INVENTION

An object of the present invention is to mitigate those drawbacks, and the present invention provides a pumping installation for pumping out an enclosure containing gases which are mixed with solid particles or which generate solid condensates or particles, said installation including a pump equipped with a feed system for supplying an inert purge gas, the pump having its exhaust orifice connected to an evacuation duct, wherein said evacuation duct is connected to said exhaust orifice via a static particle-separator device whose driving flow is solely the exhaust flow of the pump.

In a preferred embodiment, the particle-separator device comprises a convergent inlet nozzle tangentially feeding a centrifugal separating chamber into which a divergent pipe plunges along the axis thereof, the top end of the divergent pipe leading to a pipe connected to the evacuation duct, the centrifugal separating chamber including a convergent lower portion leading into a removable receptacle for collecting the particles.

BRIEF DESCRIPTION OF THE DRAWINGS

An embodiment of the invention is described below with reference to the accompanying drawings, in which.

MORE DETAILED DESCRIPTION

Figure 1:
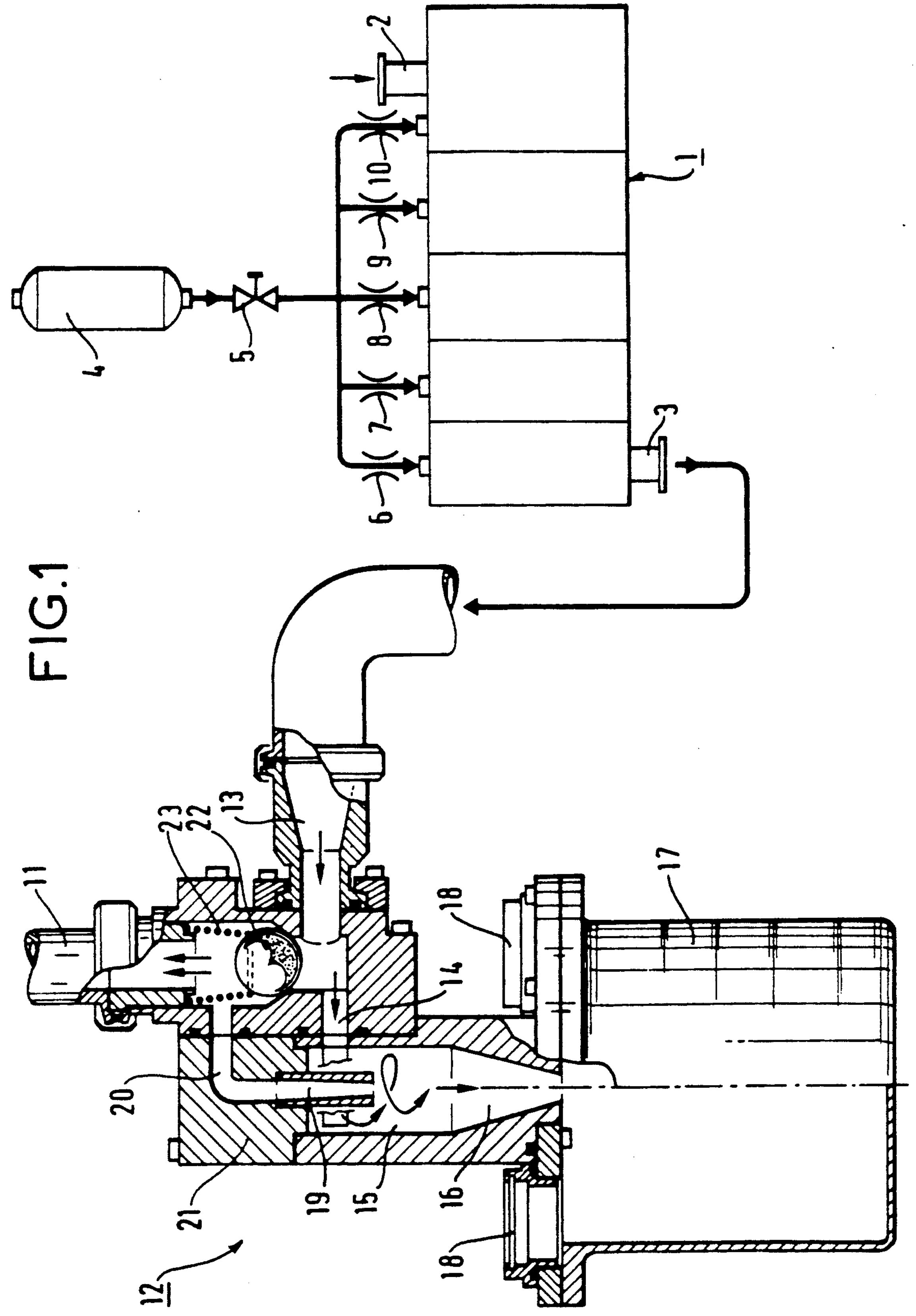
FIG. 1 shows a pumping installation of the invention.
Figure 2:
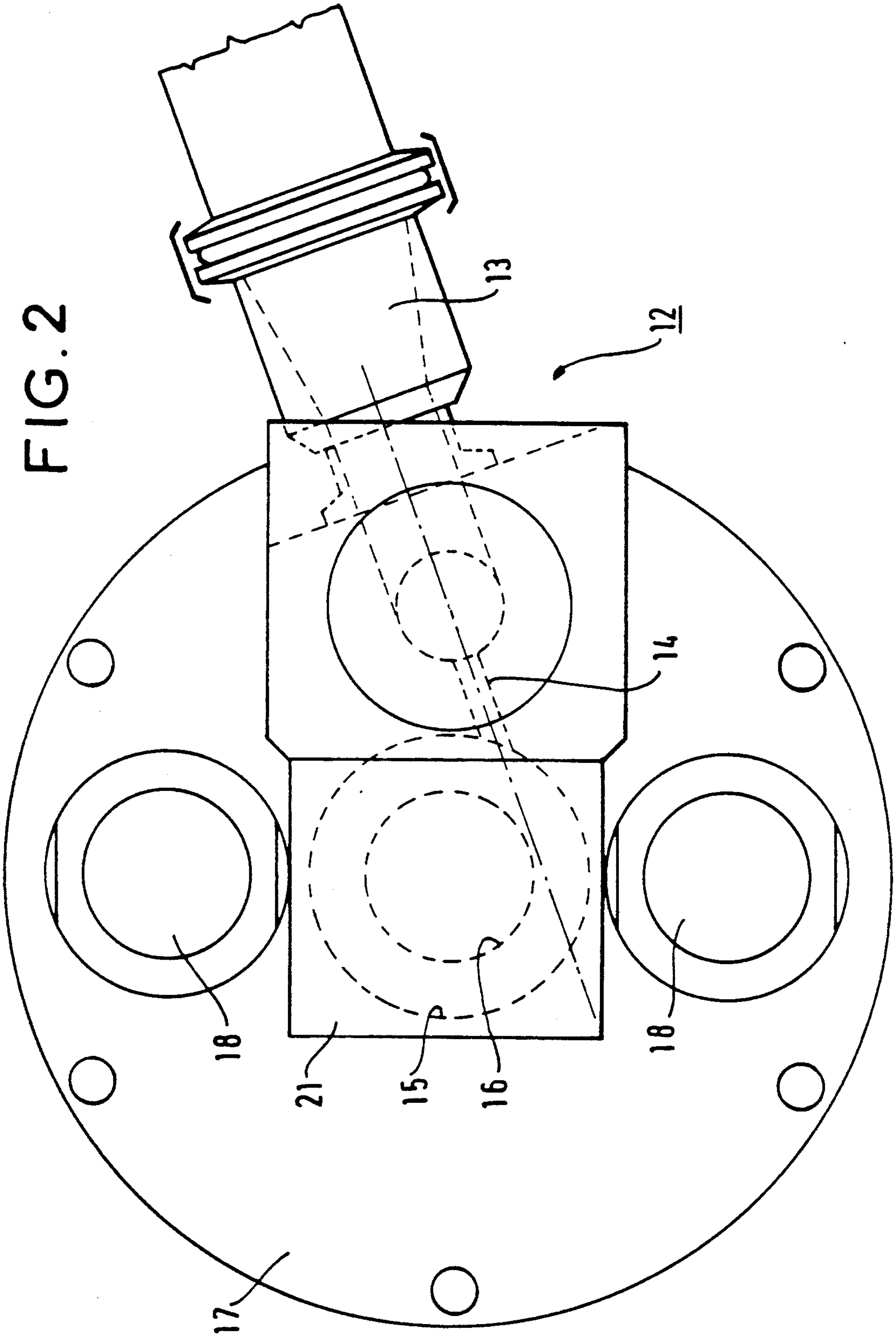
FIG. 2 is a plan view of the particle-separator device. However, in FIG. 2, the collecting receptacle is shown rotated through 90° relative to its position in FIG. 1.

The figures thus show an installation of the invention for pumping out an enclosure (not shown) containing gases which are mixed with solid particles, or which generate solid condensates or particles.

The installation includes a pumping set 1 having a suction orifice 2 designed to be connected to said enclosure to be pumped out, and an exhaust orifice 3.

The pumping set 1 is equipped with a feed system for supplying an inert purge gas, e.g. nitrogen, used to dilute and to entrain the gases. The system comprises a cylinder 4 of gas under pressure, the cylinder being equipped with a pressure-reducing valve 5 feeding the various stages of the pumping set 1 via narrow apertures 6, 7, 8, 9, and 10. In the embodiment shown, the pumping set is, for example a Roots pump which has five stages but which could be single-stage. The pumping set could also be another type of pump, such as a screw pump, a SCROLL pump, or even a molecular drag pump having an inert gas sweeping device.

This purge system dilutes the corrosive gases and enables the solid particles to be entrained while preventing them from being deposited on the walls of the pumping set itself.

In accordance with the invention, the exhaust orifice 3 of the pumping set is connected to an evacuation duct 11 via a static particle-separator device 12.

The particle-separator device is driven solely by the exhaust flow of the pumping set 1, which exhaust flow thus constitutes the driving flow of the device, which is entirely static.

The particle-separator device includes a convergent inlet nozzle 13 which, via a pipe 14, tangentially feeds a centrifugal separating chamber 15 which is extended by a convergent nozzle 16 leading into a receptacle 17 for collecting the particles. Naturally, the receptacle 17 is removable, and it includes inspection windows 18 enabling the level of filling of the receptacle to be observed.

A divergent pipe 19 plunges into the centrifugal separating chamber 15 along the axis thereof, which pipe conveys the gas, freed of the solid particles, towards the evacuation duct 11, via an internal pipe 20 in the body 21 of the separator device.

At the outlet of the convergent inlet nozzle 13, and before the inlet into the centrifugal separating chamber 15, the device has a safety valve comprising a ball 22 and a spring 23. The purpose of the valve is to enable the exhaust flow of the pump 1, or a portion of said flow, to be released directly into the evacuation duct 11, in the event of any accidental or momentary build-up of excessive pressure.

The invention applies, for example, to manufacturing semiconductors, e.g. in the method of depositing doped silicon dioxide, during which method the chemical reactions produce $PH_3$ and $B_2H_6$ which are gases that can easily condense in the form of solid oxides.

We claim:

1. In a pumping installation for pumping out an enclosure containing gases which are mixed with solid particles or which generate solid condensates or particles, said installation including a pump equipped with a feed system for supplying an inert purge gas, the pump having an exhaust orifice connected to an evacuation duct, the improvement wherein a static particle-separator is connected in series between the exhaust orifice and said evacuation duct with the complete exhaust flow of said pump exhausting through said exhaust orifice passing through said static particle-separator and solely forming the driving flow of the static particle-separator to prevent particles from being deposited in the evacuation duct whose cross-sectional area decreases over time with such deposition.

2. An installation according to claim 1, wherein the particle-separator device comprises a convergent inlet nozzle tangentially feeding a vertical axis centrifugal separating chamber into which a divergent pipe extends downwardly, along the vertical axis, a top end of the divergent pipe leads to a pipe connected to the evacuation duct at the top of said separating chamber, the centrifugal separating chamber including a convergent lower portion leading into a removable receptacle for collecting the particles.

* * * * *